March 18, 1969   S. R. MARTIN ET AL   3,433,339
CLUTCH APPARATUS
Filed Sept. 21, 1966
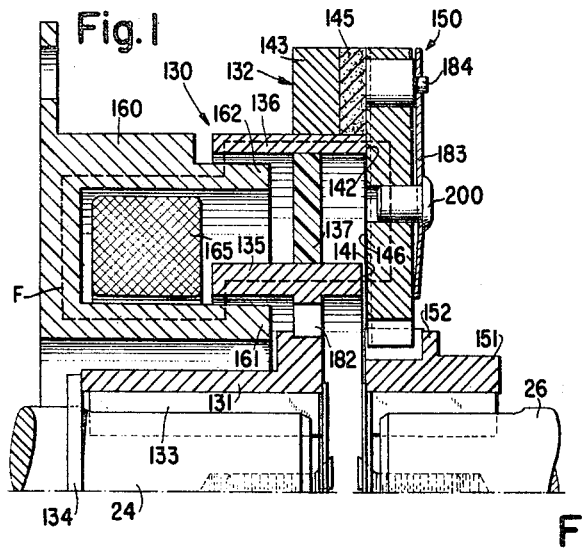
Fig. 1
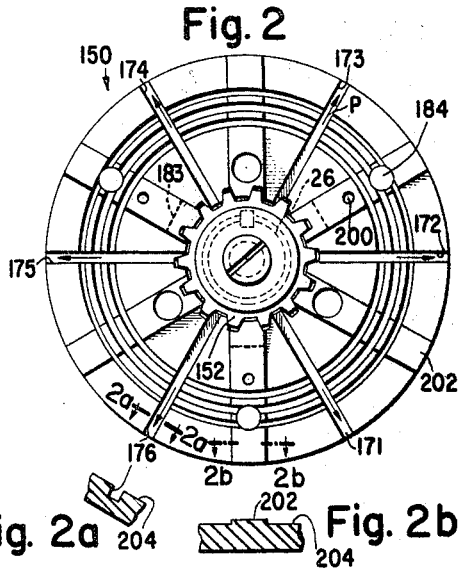
Fig. 2
Fig. 2a
Fig. 2b
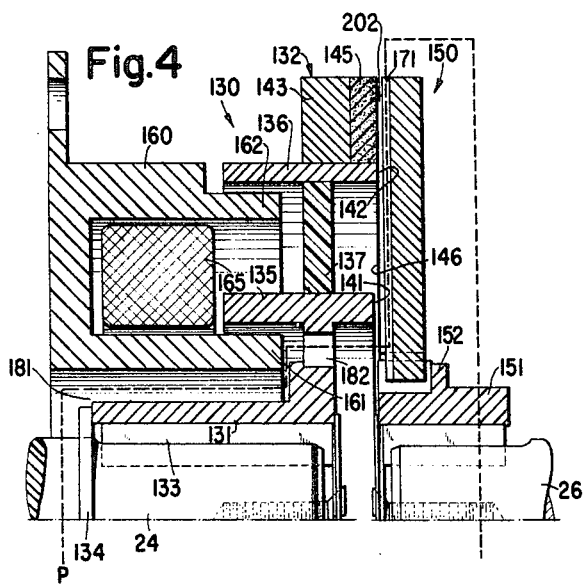
Fig. 4
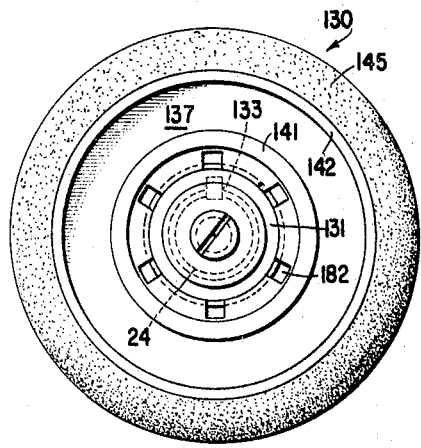
Fig. 3
INVENTOR.
Samuel R. Martin,
and John T. McKibbin
Robert F. Cody
ATTORNEY
WITNESS
Heidi Schlechauf United States Patent Office 3,433,339
Patented Mar. 18, 1969

3,433,339
CLUTCH APPARATUS
Samuel R. Martin and John T. McKibbin, High Point, N.C., assignors to The Singer Company, New York, N.Y., a corporation of New Jersey
Filed Sept. 21, 1966, Ser. No. 581,069
U.S. Cl. 192—84                                    6 Claims
Int. Cl. F16d 27/07

ABSTRACT OF THE DISCLOSURE

An electromagnetic clutch comprising a disk with first and second depth undercuts. The second depth undercuts are oil carrying grooves to break the fluid suction seal, upon release of the clutch, without reducing the electrical efficiency of the clutch.

---

This invention relates to clutch mechanisms and in particular to an improved armature element for use with a clutch as disclosed in application Ser. No. 238,968 now Patent No. 3,390,548.

Clutches according to the aforementioned patent application are provided with a continually rotatable input clutch face member, and an output clutch face member coupled to the input face member through a viscous fluid, the shearing effect of which transfers the rotation of the input member to the output member. To vary the speed of the output member, i.e. the armature, with respect to the speed of the input member, the relative distance between the face members is varied: the closer the faces, the less the slippage between the faces; the greater the distance, the greater the slippage between the faces.

To vary the distance between the clutch face members, the output face member is made of ferromagnetic material, and is positionable by means of and in accordance with current through an electromagnet fixedly supported with respect to the input member. While no trouble has been encountered insofar as quick engagement of the clutch is concerned, the rapid disengagement thereof has been far from desired. This means that when, for example, the clutch is used to drive a knitting machine, the machine continues to run an appreciable time after the current disabling stop button of the machine is operated, rather than have the machine come to an abrupt halt as desired. The cause of such continued running is believed to be the result of a fluid suction seal between the clutch face members in combination with retained magnetism within the clutch. In an attempt to break such seal, the apparatus of the aforementioned application employs spring loaded buttons to push one clutch face member with respect to the other clutch face member. This tack has not proved satisfactory since, if the springs are strong enough to break the suction seal, they are undesirably subject to wear; were the springs to be sufficiently weak as to avoid wear, they then would be too ineffective for their intended purpose.

Various expediences have been tried in an effort to solve the abovementioned clutch disengagement problem, least of which is a comparatively complex electrical bias circuit that becomes operative to repel the clutch face members apart at actuation of the aforementioned stop button. The technique of the invention however is to modify simply the general configuration of the output clutch face member, i.e. the clutch armature. The clutch armature as disclosed in application Ser. No. 238,968 now Patent No. 3,390,548 is disc-like and circular, having a plurality of radial facial slots for conveying coupling fluid, and having three spring loaded buttons emanating from the armature output clutch face member as discussed above. To the face of the armature, the invention suggests undercutting slightly the face adjacent to each of the buttons, say to about .005 inch, whereby a thin film suction seal is prevented. While it might appear that such a technique would improve the decoupling operation of the clutch at the expense of effective clutch coupling (i.e. the average distance between the clutch faces would now be greater) this has not been the case, apparently because of improved coaction between the clutch face members as caused by the propelling force of the coupling fluid against the undercuts of the output clutch face member.

A principal object of the invention is to provide improved clutch apparatus.

Another object of the invention is to provide an improved armature output clutch face member for a clutch of the type disclosed in application Ser. No. 238,968.

The invention will be described with reference to the figures wherein:

FIG. 1 is a fragmentary sectional view of a clutch according to the invention and showing the path of the flow of its magnetic flux, FIG. 2 is a face view of the armature output face member of the clutch of FIG. 1 shown at reduced scale, FIGS. 2a and 2b are sectional views taken respectively along line 2a—2a and 2b—2b of FIG. 2, FIG. 3 is a face view of the rotor input face member of the clutch of FIG. 1 shown at the same reduced scale as used in FIG. 2, and FIG. 4 is a fragmentary view of the clutch of FIG. 1 showing the path of flow of fluid within the clutch.

Referring to the figures, the clutch of the invention has an input shaft 24 and an output shaft 26 both of which are supported within a housing (not shown) that is half-filled with a viscous fluid such as oil. In carrying out the invention, the driving face member or rotor 130 is secured to the input shaft 24 and the output face member or armature 150 is secured to the output shaft 26. The rotor includes a hub 131 mounting a disc portion 132, the hub 131 being secured to the shaft by a key 133 and locked against endwise movement by suitable means, preferably a snap ring 134 set in a shallow groove formed on the input shaft 24. The disc 132 is of composite construction including coaxial sleeves 135, 136 of magnetic material spaced apart by a nonmagnetic annulus 136 to form separate annular poles 141, 142. Surrounding the sleeve 136 is a further annulus 143 to which is cemented, or otherwise secured, an annular friction member 145.

The armature output member 150 is mounted on a hub 151 providing a freely slidable spline 152. The armature 150 is preferably made of soft steel or other magnetic material, and serves to complete the magnetic circuit between the poles 141, 142 of the rotor input member 130. For the purpose of establishing a flow of flux through the poles 141, 142, a stationary annular electromagnet 160 is provided having poles 161, 162. The poles 161, 162 axially overlap, and have close spacing with respect to the pole members 135, 136 of the rotor 130. The magnet 160 accommodates an annular coil 165 to which current may be conducted.

It will be apparent from FIG. 1 that the magnetic flux F passes from the electromagnet 160 through the annular poles 135, 136 for magnetic attraction of the armature 150 which is free to move axially on its spline 152, the amount of magnetic force, and hence the variable speed coupling distance between the clutch input rotor 130 and output armature 150, being dependent upon the current flow through the winding 165.

Preferably the friction material 145 is made flush with the pole 142 while the pole 141 is undercut to provide a small amount of clearance 146 on the order of a few thousandths of an inch. Sharp edged, radial grooves 171–176 are formed in the face of the armature output member 150 for the purpose of conducting coupling oil to the region between the clutch faces (see P, FIG. 4) which are in engagement and to provide an escape path for the oil film. For the purpose of admitting the coupling oil to the inner ends of the grooves 171–176, the magnet 160 is so sized with respect to the hub 131 as to provide an annular oil passageway 181; and the rotor 130 is provided with openings 182 at spaced intervals (see FIGS. 3 and 4).

The armature 150 carries a set of three separator springs 183 having respective buttons 184 thereon, the buttons being adapted to engage the face of the rotor 130. One spring assembly is especially illustrated in FIG. 1: A rivet 200 passes through a hole in the spring 183 and is pressed into a recess provided in the armature 150; the button 184, which is fixed to the spring 183, loosely fits in a second hole in the armature 150.

With the coil 165 energized, the button 184 presses against the friction material 145, thereby tending to straighten the spring 183. Such action causes a pressure build-up at the rear of the button 184. With the coil 165 deenergized, the magnetic attractive force is released, whereupon the spring 183 applies its stored energy at the rear of the button 184 to disengage the armature 150 from the friction material 145. As earlier stated, the spring force has not been found to be sufficient enough to break the suction seal caused by the coupling fluid. Though increasing the stiffness of the spring 183 would, as indicated above, serve to break the suction seal for proper decoupling purposes, such an expedient would also introduce a new problem to the clutch, to wit, increasing the wear of the buttons 184 against the friction material 145 of the rotor 130. To relieve the pressure of the suction seal without affecting the acceptable operation of the springs 183, the invention provides the face of the armature 150 with undercuts 204 as shown in FIGS. 2a and 2b, whereby the spring buttons 184 emanate from lands 202 on the armature 150, and still operate as intended. The undercuts are provided by grinding down the face of the armature 150 by about .005 inch, preferably to form six pie-shaped regions, within which regions are the respective grooves 171–176. In other words, whereas the grooves 171–176 had formerly been preferably cut to about .1 inch deep, such grooves would now be .995 inch deep, but located within pie-shaped grooves (themselves .005 inch deep). By providing an armature the cross section of which has 3 levels of fluid coupling, the tendency of the fluid to form a thin film suction is eliminated, and hence the springs 183 and buttons 184 can function as intended, i.e. by lightly pushing the armature 150 away from the input member 130.

Having thus set forth the nature of this invention, what is claimed herein is:

1. In a driving arrangement for a machine or the like, the combination comprising a source of rotative power having a speed at least as high as the maximum speed required by the machine, a variable speed drive adapted to be coupled between the source and the machine, said variable speed drive coupling having an input and an output shaft, adjacent input and output clutch members at the opposed ends of said shafts, one of said members having a pair of annular pole pieces and the other member being made of magnetic material, a stationary electromagnet cooperating with said annular pole pieces and having a coil therein for varying the magnetism of said member with said pole pieces, at least one of said members being mounted for limited endwise movement on its shaft so that variation in the current through the coil produces variation in the slip of the output member relative to the input member, a least one of said members having a set of radial grooves formed on the face thereof, means for feeding oil to the inner ends of the grooves so that upon rotation in said coupling the oil is pumped through the grooves by centrifugal force for supplying of oil between the faces of the members, spring biased means so projecting from the face of one member to the face of the other member that said spring biased means may hold the members apart when the electromagnet is not excited, one of said members being provided with facial undercuts less deep than the depth of said radial grooves, said facial undercuts being juxtaposed the contact parts for said spring biased means.

2. In a variable speed coupling for powering a machine or the like, the combination comprising input and output shafts and means for supporting said shafts end to end, input and output members secured to the ends of said shafts, said members having engaging clutch faces, a charge of oil between said members at least one of the members having radial grooves in its face for conducting said oil and forming it into a film, electromagnetic means for varying the force at the clutch faces thereby to vary the film thickness, the other one of said members having an annular liner of friction material, said grooved member having a plurality of spring biased buttons mounted therein and bearing upon said liner so that when the electromagnet is deenerigized the biasing force exerted by said buttons to separate said member, said grooved member being provided with undercuts adjacent said buttons, said undercuts being less deep than said grooves, and being so disposed that said grooves reside within said undercuts.

3. Apparatus for use in a fluid clutch, said apparatus being in the nature of a disc and comprising spring biasing means, pressing means coupled to said spring biasing means and adapted to project from the face of said disc in response to the tension of said spring biasing means, said face being undercut in places to provide first and second different depths below the face of said disc.

4. The apparatus of claim 3 wherein said pressing means projects from said disc on the part of the face thereof which is not undercut.

5. The apparatus of claim 4 wherein the undercuts which are cut to said first depth are deeper than the undercuts which are cut to said second depth, and wherein said first undercuts reside within said second undercuts.

6. The apparatus of claim 5 wherein said disc is circular, and wherein said undercuts of said first and second depths are both radially disposed on the face of said disc.

References Cited

UNITED STATES PATENTS

| | | | |
|---|---|---|---|
| 3,390,548 | 7/1968 | Rogerson et al. | |
| 2,690,248 | 9/1954 | McDowall | 192—107 X |
| 2,856,049 | 10/1958 | Schjolin | 192—113.2 X |
| 2,879,872 | 3/1959 | Van Ranst | 192—107 X |
| 3,048,250 | 8/1962 | Kershner | 192—107 |

CARLTON R. CROYLE, *Primary Examiner.*

A. D. HERRMANN, *Assistant Examiner.*

U.S. Cl. X.R.

192—107, 113; 188—264